United States Patent
Kanagarajan et al.

(10) Patent No.: US 11,341,861 B2
(45) Date of Patent: May 24, 2022

(54) METHODS AND SYSTEMS FOR RELEVANCE DETERMINATION OF SHARED ENVIRONMENTAL DATA BASED ON VEHICLE CONTEXT

(71) Applicant: Honeywell International Inc., Morris Plains, NJ (US)

(72) Inventors: Sivakumar Kanagarajan, TamilNadu (IN); Jason Marcel Garde, Anthem, AZ (US); Visvanathan Thanigai Nathan, Bangalore (IN); Amrit Kaur Mann, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 136 days.

(21) Appl. No.: 16/183,272

(22) Filed: Nov. 7, 2018

(65) Prior Publication Data

US 2020/0143694 A1    May 7, 2020

(51) Int. Cl.
| | | |
|---|---|---|
| *G08G 5/00* | (2006.01) | |
| *G01C 23/00* | (2006.01) | |
| *B64D 45/00* | (2006.01) | |
| *G08B 19/02* | (2006.01) | |
| *B64D 15/20* | (2006.01) | |
| *G01W 1/10* | (2006.01) | |

(52) U.S. Cl.
CPC ............ *G08G 5/0091* (2013.01); *G01W 1/10* (2013.01); *G08G 5/0008* (2013.01); *G08G 5/0039* (2013.01)

(58) Field of Classification Search
None
See application file for complete search history.

(56) References Cited

U.S. PATENT DOCUMENTS 5,354,015 A * 10/1994 Meador ................. B64D 15/20
                                                     244/134 F
6,043,756 A    3/2000 Bateman et al.
6,501,392 B2  12/2002 Gremmert et al.
(Continued)

FOREIGN PATENT DOCUMENTS

EP      2058228 A2    5/2009
EP      2256957 A2   12/2010

OTHER PUBLICATIONS

Extended EP Search Report dated Mar. 24, 2020 in corresponding European Patent Application No. 19207317.9.

*Primary Examiner* — Adam D Tissot
*Assistant Examiner* — Laura E Linhardt
(74) *Attorney, Agent, or Firm* — Bookoff McAndrews, PLLC

(57) ABSTRACT

Systems and methods are disclosed for environmental data sharing and context-based relevance determination. One method comprises receiving, by an environmental condition response system of a receiving vehicle, environmental data associated with a sending vehicle. Then, the environmental condition response system of the receiving vehicle analyzes the received environmental data for relevance based on contextual information of the receiving vehicle. Based on determining that the received environmental data is relevant to the receiving vehicle, the environmental condition response system determines a remedial action and sends instructions to perform the remedial action to a corresponding vehicle component system of the receiving vehicle.

20 Claims, 5 Drawing Sheets

(56) References Cited

U.S. PATENT DOCUMENTS

| | | | |
|---|---|---|---|
| 7,471,995 B1 | 12/2008 | Robinson | |
| 7,633,428 B1 | 12/2009 | McCusker et al. | |
| 8,135,500 B1 | 3/2012 | Robinson | |
| 9,221,548 B1 | 12/2015 | Sishtla et al. | |
| 9,483,951 B1* | 11/2016 | McCusker | B64D 45/00 |
| 9,535,158 B1 | 1/2017 | Breiholz et al. | |
| 9,846,230 B1 | 12/2017 | Finley et al. | |
| 2008/0195264 A1 | 8/2008 | Deker et al. | |
| 2010/0332056 A1* | 12/2010 | Kirk | G01W 1/04 |
| | | | 701/14 |
| 2011/0050458 A1 | 3/2011 | Bailey et al. | |
| 2012/0085868 A1* | 4/2012 | Barnes | B64D 15/20 |
| | | | 244/134 F |
| 2017/0161765 A1 | 6/2017 | Cheatham, III et al. | |
| 2018/0186468 A1* | 7/2018 | Songa | G01S 7/003 |
| 2019/0304314 A1* | 10/2019 | Hochwarth | G08G 5/0008 |

\* cited by examiner

METHODS AND SYSTEMS FOR RELEVANCE DETERMINATION OF SHARED ENVIRONMENTAL DATA BASED ON VEHICLE CONTEXT

TECHNICAL FIELD

The present disclosure relates to methods and systems for analyzing environmental conditions adverse to a vehicular travel. More particularly, the present disclosure relates to methods and systems for exchanging environmental data between moving vehicles and analyzing the environmental data for relevance based on contextual information. The present disclosure further relates to methods and systems for performing a remedial action based on the analyzed environmental data.

BACKGROUND

Disruptive weather conditions are a key concern in the aviation industry. While major weather events such as, e.g., hurricanes, snowstorms, etc. can have a major impact on aircraft operation and route planning, seemingly moderate or normal weather conditions can also affect flights in different ways, from wind strength and direction to the more challenging snow or heavy fog. For example, ice formation on aircraft can disrupt smooth flow of air, increasing drag while decreasing the ability of the airfoil to create lift. Further, the weight of the ice combined with the changes to the airfoil can increase the stall speed, which can have a detrimental effect during the landing phrase of a flight.

Various hardware deployment solutions have been proposed to address the weather-related concerns. However, the hardware deployment solution alone may not be sufficient as it could lead to decreased effectiveness or even a failure, depending on the severity of the weather conditions and the context of the subject vehicle. For example, many aircraft are equipped with de-icing/anti-icing systems to prevent or counteract the ice formation, but the rate of the ice buildup can sometimes be too rapid to be counteracted by the implemented systems. Also, some aircraft are not equipped with such systems or capabilities.

Therefore, there is a need for a mechanism that enables vehicle operators to more effectively anticipate and prepare for weather-related events. In particular, there is a need for a mechanism that enables moving vehicles within a vicinity to share critical environmental data, intelligently determine the relevance of the shared critical environmental data from the perspective of a receiving vehicle, and take appropriate remedial actions if the shared critical environmental data is relevant to the receiving vehicle.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

Further, while the background description was provided in the context of an aircraft, it would be obvious to one of ordinary skill in the pertinent art that the same need may exist in other contexts, including but not limited to motor vehicles (e.g., motorcycles, cars, trucks, buses, etc.), railed vehicles (e.g., trains, trams, subways, etc.), watercraft (e.g., ships, boats, yachts, etc.), spacecraft, drones, manned and unmanned vehicles, and any other vehicles or moving machines. Therefore, the exemplary embodiment of the current disclosure may not be limited to aircraft deployment, but may also be integrated with other machines, systems, components, or any other environment or context in which the aforementioned need may exist.

SUMMARY OF THE DISCLOSURE

One embodiment provides a computer implemented method for environmental data sharing and context-based relevance determination, comprising: receiving, by an environmental condition response system of a receiving vehicle, environmental data associated with a sending vehicle; analyzing, by the environmental condition response system of the receiving vehicle, the received environmental data for relevance based on contextual information of the receiving vehicle; determining, by the environmental condition response system of the receiving vehicle, a remedial action based on determining that the received environmental data is relevant to the receiving vehicle; and sending, by the environmental condition response system of the receiving vehicle, instructions to perform the remedial action to a corresponding vehicle component system of the receiving vehicle.

One embodiment provides an environmental condition response system for environmental data sharing and context-based relevance determination. The system may comprise one or more processors; and a non-transitory computer readable medium storing instructions which, when executed by the one or more processors, cause the one or more processors to perform a method comprising: receiving environmental data associated with a sending vehicle; analyzing the received environmental data for relevance based on contextual information of the receiving vehicle; determining a remedial action based on determining that the received environmental data is relevant to the receiving vehicle; and sending instructions to perform the remedial action to a corresponding vehicle component system of the receiving vehicle.

One embodiment provides a non-transitory computer readable medium for environmental data sharing and context-based relevance determination. The non-transitory computer readable medium may store instructions that, when executed by one or more processors, cause the one or more processors to perform a method comprising: receiving, by an environmental condition response system of a receiving vehicle, environmental data associated with a sending vehicle; analyzing, by the environmental condition response system of the receiving vehicle, the received environmental data for relevance based on contextual information of the receiving vehicle; determining, by the environmental condition response system of the receiving vehicle, a remedial action based on determining that the received environmental data is relevant to the receiving vehicle; and sending, by the environmental condition response system of the receiving vehicle, instructions to perform the remedial action to a corresponding vehicle component system of the receiving vehicle.

BRIEF DESCRIPTION OF THE DRAWINGS

Embodiments of the invention will now be described, by way of example only, with reference to the accompanying drawings in which.

DETAILED DESCRIPTION

The following embodiments describe systems and methods for exchanging environmental data between moving vehicles, analyzing the environmental data for relevance based on contextual information, and performing a remedial action based on the analyzed environmental data.

The disclosed embodiment may enable moving vehicles to share real-time environmental data through connected technologies, and to intelligently determine the relevance of the received environmental data based on the context of the receiving vehicle. The disclosed embodiment may thus enable receiving vehicles to anticipate and prepare for environmental conditions that may adversely affect vehicle operation and safety. In one embodiment, if the received information is determined to be relevant, appropriate remedial action(s) may be performed by the receiving vehicle either automatically or manually (i.e., by the vehicle operator). In the case of manual operation, recommended remedial action(s) may be presented to the vehicle operator.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Figure 1:
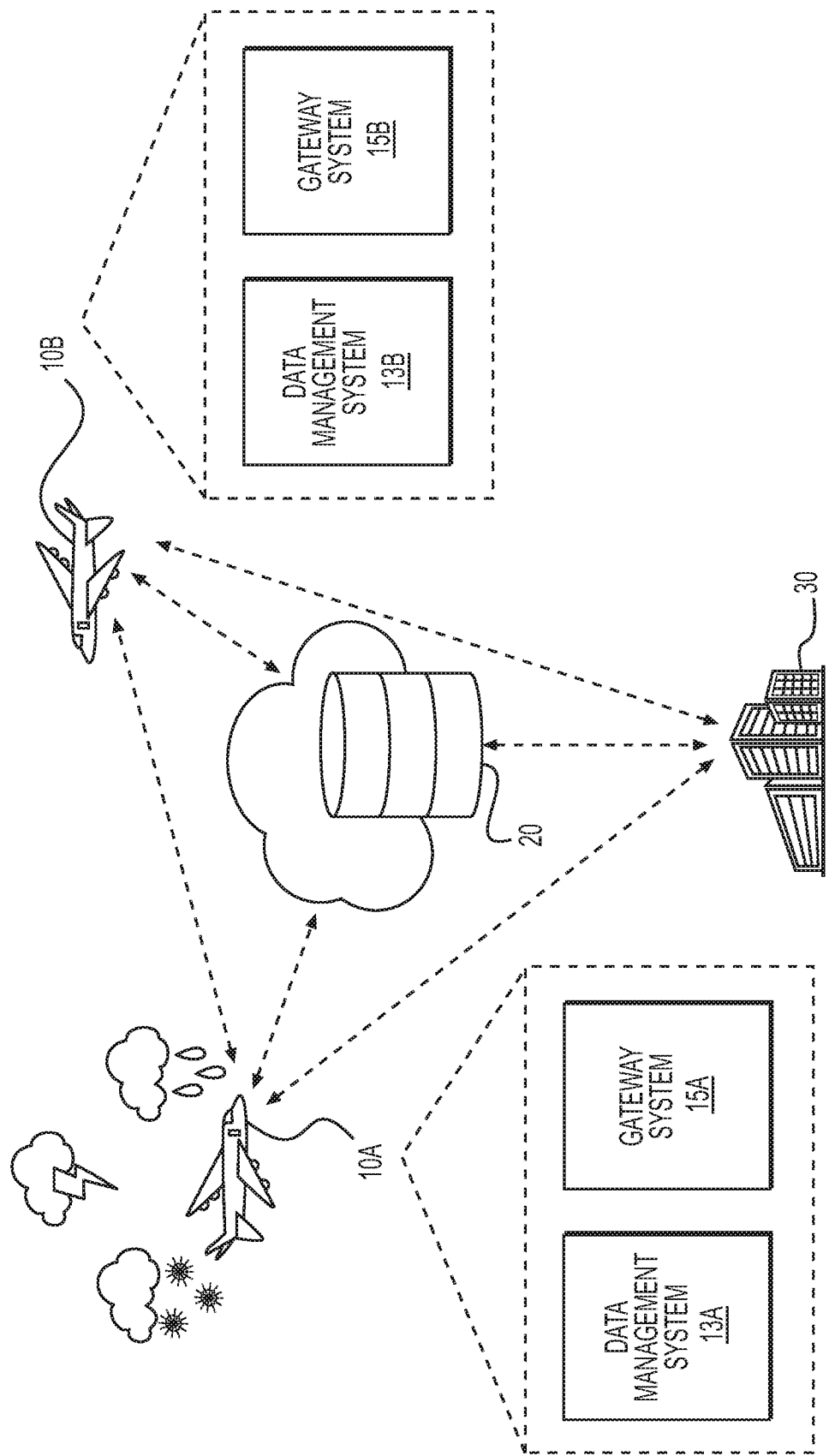
FIG. 1 shows an exemplary embodiment of a system of communicatively coupled vehicles, at least one data server, and at least one remote system.

Referring now to the appended drawings, FIG. 1 shows an exemplary embodiment of a system of communicatively coupled vehicles, at least one data server, and at least one remote system. In general, FIG. 1 depicts vehicles 10A and 10B, at least one data server 20, and at least one remote system 30. Each vehicle, such as vehicle 10A or vehicle 10B, may include at least one data management system and a gateway system. For example, vehicle 10A may include data management system 13A and gateway system 15A. Data management system 13A may be configured to collect, store, and manage various data captured by different vehicle component systems of vehicle 10A. For example, vehicle 10A may include vehicle component systems such as, e.g., a propulsion system, a vehicle control system, an environmental system, a navigation system, a travel management system, a communication system, a maintenance system, etc. The data management system 13A may be in communication with the vehicle component systems, and may be configured to collect, store, and manage the various data captured by the vehicle component systems.

A data management system may also be in communication with a gateway system. For example, data management system 13A of vehicle 10A may be in communication with gateway system 15A, and may be configured to send data to and receive data from the gateway system 15A. A gateway system of a vehicle may be in communication with gateway systems of other vehicles. For example, gateway system 15A of vehicle 10A may be in communication with gateway system 15B of vehicle 10B. Through this communication path, the data collected and managed by the data management system of one vehicle may be transmitted to another vehicle, by using the gateway systems of the respective vehicles to send and receive data. Therefore, the gateway systems enable direct transmission of data between two vehicles and/or among multiple vehicles. The communication path between the gateway systems may be through satellite communications (e.g., SATCOM), cellular networks, Wi-Fi (e.g., IEEE 802.11 compliant), datalink, radio/radiotelephony communication, WiMAx (e.g., AeroMACS), optical fiber, and/or air-to-ground (ATG) network, and/or any other communication links now known or later developed.

A gateway system of a vehicle may also be in communication with data server(s) 20, which may be located remotely from the vehicle (i.e., off-board). Data server(s) 20 may receive data from the gateway systems, store and manage the data, and send the data to gateway systems of vehicles that may be in need of the data. The gateway system may thus transmit data to and obtain data from the data server(s) 20. Although only one data server 20 is illustrated in FIG. 1, it should be noted that multiple data servers may be in communication with the gateway systems of the vehicles. Each of the data server(s) 20 may be implemented in a dedicated location, such as a server system, or may be implemented in a decentralized manner, for example, as part of a cloud system. The communication path between the gateway systems and the data server(s) 20 may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed.

A gateway system of a vehicle may also be in communication with remote system(s) 30. Examples of remote system(s) 30 may include, but not limited to, air traffic controllers, ground service centers, airport systems, weather service systems, etc. In some embodiments, remote system(s) 30 may be ground-based systems that may utilize the data received from the gateway systems to aid in vehicle operation, vehicle navigation, vehicle traffic control, vehicle maintenance, vehicle travel schedule, etc. Although only one remote system 30 is illustrated in FIG. 1, it should be noted that multiple remote systems may be in communication with the gateway systems of the vehicles. The gateway system may thus transmit data to and obtain data from the remote system(s) 30. The communication path between the gateway systems and the remote system(s) 30 may be through satellite communications (e.g., SATCOM), cellular networks, Wi-Fi (e.g., IEEE 802.11 compliant), WiMAx (e.g., AeroMACS), optical fiber, and/or air-to-ground (ATG) network, and/or any other communication links now known or later developed.

Figure 2:
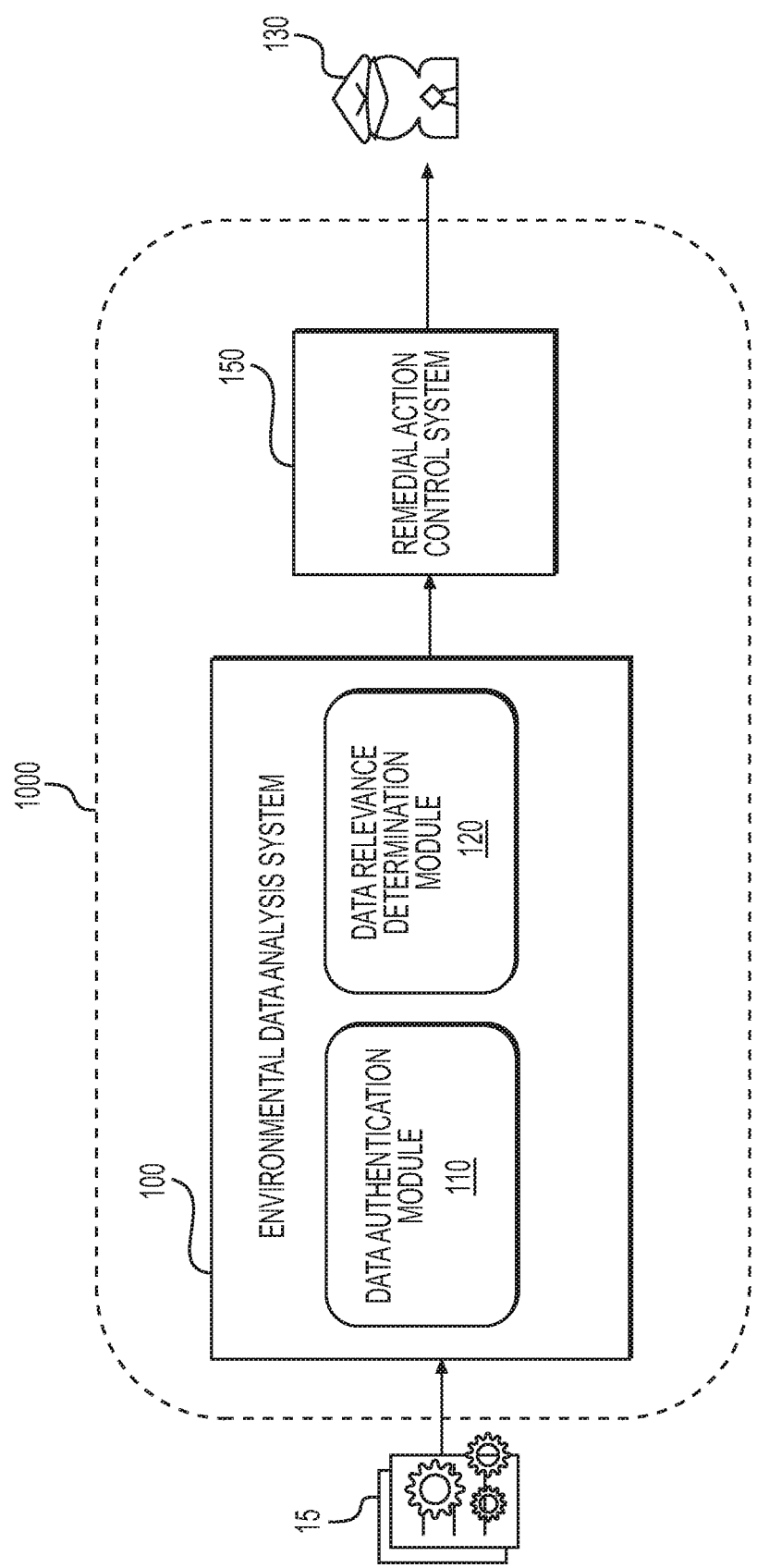
FIG. 2 shows an exemplary embodiment of an environmental condition response system implemented in an aircraft, according to one aspect of the current disclosure.

FIG. 2 shows an exemplary embodiment of an environmental condition response system implemented in an aircraft, according to one aspect of the current disclosure. It should be noted that, the exemplary embodiment of the current disclosure may not be limited to the vehicle type discussed specifically herein (e.g., aircraft), but may also be integrated with machines, systems, components, or any other environment or context in which the exemplary embodiment may be applicable or needed. For example, it would be obvious to one of ordinary skill in the pertinent art that the exemplary embodiment may be implemented in many contexts, including but not limited to aircraft, motor vehicles (e.g., motorcycles, cars, trucks, buses, etc.), railed vehicles (e.g., trains, trams, subways, etc.), watercraft (e.g., ships, boats, yachts, etc.), spacecraft, drones, manned and unmanned vehicles, and any other vehicles or moving machines.

In general, FIG. 2 depicts environmental data 15, an environmental condition response system 1000, and a vehicle operator 130. In particular, the environmental condition response system 1000 may include an environmental data analysis system 100 comprising a data authentication module 110 and a data relevance determination module 120, and a remedial action control system 150.

Environmental data 15 may be data that is received at a vehicle (i.e., a receiving vehicle) from another vehicle (i.e., a sending vehicle), directly or indirectly through a data server or a remote system, and may comprise information related to environmental conditions experienced by the sending vehicle. Environmental data 15 may also indicate the times the environmental conditions are experienced by the sending vehicle and the positions/locations of the sending vehicle when the environmental conditions are experienced (i.e., locations of the experienced environmental conditions). For example, the environmental conditions experienced by the sending vehicle may include weather conditions (e.g., rain, snow, temperature, humidity, etc.). In some embodiments, the environmental data 15 exchanged between aircraft may largely include environmental conditions that may adversely affect vehicle operation and/or routing. For example, in the context of an aircraft, such an environmental condition may include an icing condition (e.g., ice formed on wings and/or fins), which may cause an increased stall speed and a drag on an aircraft. The environmental data 15 may thus comprise, for example, icing conditions experienced by the sending aircraft, including a time of ice accretion, a location of the sending vehicle at the time of ice accretion, a rate of ice accretion, an approximate duration of de-icing/anti-icing system operation, and any other data related to the icing conditions (e.g., vehicle specification, speed, altitude, temperature, flight route, other weather data, etc.).

Environmental condition response system 1000 may receive and process the environmental data 15, and may direct appropriate vehicle component system(s) to perform remedial actions and/or may notify vehicle operator 130 of an impending environmental event. To perform these functions, the environmental condition response system 1000 may comprise the environmental data analysis system 100 and the remedial action control system 150. The environmental data 15 may first be processed by the environmental data analysis system 100 of the environmental condition response system 1000. More specifically, the environmental data 15 may first go through an authentication process by a data authentication module 110 of the environmental data analysis system 100. Data authentication module 110 may prevent incoming data from contaminating or compromising various on-board systems as well as the data stored thereon, and may also block intrusion by unauthorized entities. Once the environmental data 15 has been authenticated by the data authentication module 110, a data relevance determination module 120 of the environmental data analysis system 100 may determine whether the environmental data 15 is relevant to the receiving vehicle, based on the contextual information associated with the receiving vehicle. If the data relevance determination module 120 determines that the environmental data 15 is relevant, a remedial action control system 150 may then determine one or more remedial actions to be performed by the receiving vehicle, and send instructions/commands to appropriate vehicle component system(s) configured to perform the one or more remedial actions.

Figure 3:
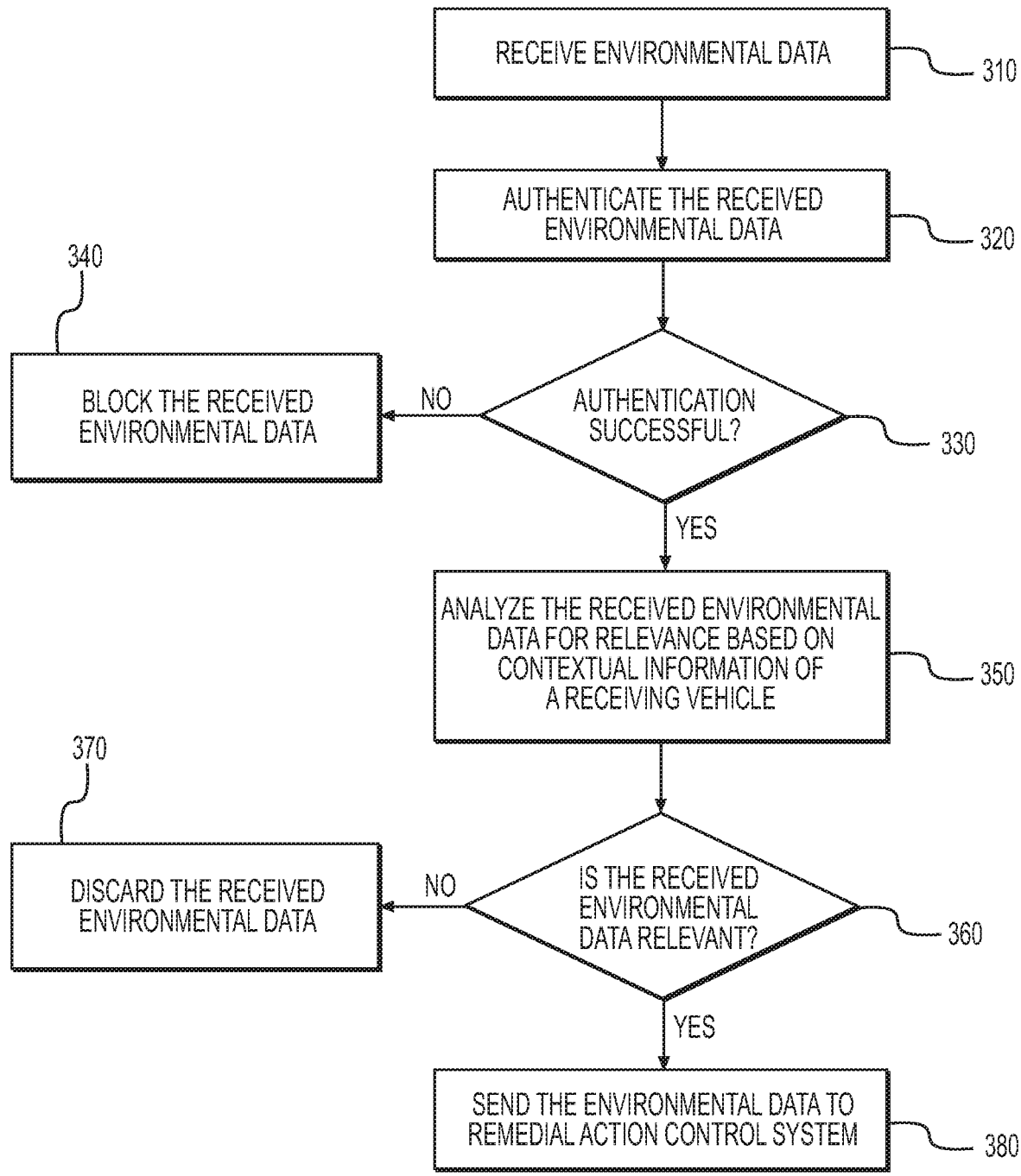
FIG. 3 is a flowchart illustrating an exemplary method of analyzing environmental data for relevance, according to one aspect of the current disclosure.

FIG. 3 is a flowchart illustrating an exemplary method of analyzing environmental data for relevance, according to one aspect of the current disclosure. In particular, the exemplary method illustrated in FIG. 3 may be performed by the environmental data analysis system 100 of the environmental condition response system 1000. At step 310, the environmental data analysis system 100 of a receiving vehicle may receive the environmental data 15 from a sending vehicle (or a data server or a remote system). As alluded to above, the environmental data 15 may comprise, for example, information related to icing conditions experienced by the sending vehicle, such as time(s) at which the icing conditions are experienced by the sending vehicle (e.g., in coordinated universal time (UTC)), a location and altitude of the sending vehicle at the time of ice accretion, a type and amount of ice encountered, an airspace volume where ice accretion occurs, a rate of ice accretion, an approximate duration of de-icing/anti-icing system operation, exited icing conditions, and any other data related to the icing conditions (e.g., vehicle specification, speed, altitude, temperature, flight route, other weather data, etc.). It should be noted that, although icing conditions are specifically discussed herein as an example of the environmental data 15, the environmental data 15 may comprise information related to any environmental condition that may affect the sending vehicle, including but not limited to rain, wind, cloud, snow, fog, sun, etc.

Continuing with FIG. 3, at step 320, the data authentication module 110 of the environmental data analysis system 100 may perform an authentication process or a series of authentication processes on the received environmental data 15, to ensure safety and integrity of the received environmental data 15. In one embodiment, the authenticity of the received environmental data 15 may be determined based on an approved travel plan (e.g., flight plan) of the sending vehicle. For example, if the travel plan of the sending vehicle indicates that the location of the sending vehicle is more than a predetermined distance away from the location of the receiving vehicle, the data authentication module 110 may determine that the received environmental data 15 is sent in error, resulting in an authentication failure. In some embodiments, the authentication process may require one or more keys to be provided from the received environmental data 15 for the data authentication module 110 to verify the authenticity. For more robust protection, the data authentication module 110 may perform a series of authentication processes, each authentication process requiring one or more keys to be provided from the received environmental data 15. Means of authentication may include passwords, smart cards, physical keys, electronic keys, digital tokens, digital certificates, digital/handwritten signatures, device identifiers, IP addresses, biometric information such as voice prints, photos, fingerprints, facial scan, retinal scan, etc., and any now-known or later-developed means of authentication. Means of authentication may be collected at the sending vehicle, and one or more keys may be generated based on the collected information.

The one or more keys may then be transmitted to the data authentication module 110 of the receiving vehicle as part of the environmental data 15, and compared with one or more control keys maintained at the data authentication module 110 for verification. Alternatively, the collected information may be directly transmitted to the data authentication module 110 of the receiving vehicle as part of the environmental data 15, converted to one or more keys at the data authentication module 110, and then compared with one or more control keys. If the one or more keys match the one or more control keys, the environmental data 15 may be authenticated. It should be noted that any now-known or later-developed authentication method may be used to authenticate the received environmental data 15, and the key-based authentication method discussed herein is provided as an example, and not in a limiting manner.

At step 330, the data authentication module 110 may determine whether the authentication of the received environmental data 15 is successful. If the authentication is unsuccessful, the method may proceed to step 340 where the received environmental data 15 is blocked or rejected by the data authentication module 110. More specifically, the environmental data 15 that fails the authentication process may be discarded or quarantined by the data authentication module 110. If the authentication is successful, the method may proceed to step 350.

Upon a successful authentication, at step 350, the data relevance determination module 120 may further analyze the environmental data 15 for relevance based on the contextual information of the receiving vehicle. The contextual information of the receiving vehicle may include, but not limited to, a current time (e.g., a time at which the environmental data 15 is received by the receiving vehicle, in coordinated universal time (UTC)), a flight plan (e.g., planned flight path), altitude, an estimated time of arrival at the reported ice accretion location, position, speed, size/weight, vehicle type, vehicle capability, vehicle specification, environmental condition of the receiving vehicle (e.g., temperature, humidity, etc.), and any other aspect of the receiving vehicle that may be used to determine the relevance of the received environmental data 15. For example, for the environmental data 15 to be relevant (i.e., useful for safe operation of the receiving vehicle), the time and location/altitude of the sending vehicle at the time of ice accretion may need to be within a defined envelope (i.e., within a predefined proximity) of the planned flight path of the receiving vehicle. Also, the time of ice accretion at the sending vehicle and the current time (e.g., the time at which the environmental data 15 is received at the receiving vehicle) may need to be within a specified time window, for the environmental 15 to be relevant to the receiving vehicle. For example, if too much time has passed since the time of ice accretion, the received environmental data 15 may be considered irrelevant or stale (e.g., indicated by a low relevance score).

Another factor that may be considered in determining the relevance of the environmental data 15 is the estimated time of arrival (ETA) at the reported ice accretion location. The estimated time of arrival may be calculated using the reported location of the ice accretion (e.g., airspace volume where the ice accretion occurred, or the location of the sending vehicle at the time of ice accretion), speed of the receiving vehicle, and the distance between the receiving vehicle and the reported location of the ice accretion. If the estimated time of arrival is within a predetermined time window, the environmental data 15 may be relevant to the receiving vehicle. For example, if the estimated time of arrival is five minutes and the predetermined time window is ten minutes, the environmental data 15 may be determined to be relevant. On the other hand, if the estimated time of arrival is fifteen minutes and the predetermined time window is ten minutes, the environmental data 15 may be determined to be irrelevant.

The predetermined time window may be adjusted based on certain contextual information of the receiving vehicle. For example, vehicle capability and/or specification may be considered in configuring the predetermined time window. For example, if the data relevance determination module 120 determines that the receiving vehicle is not equipped with de-icing/anti-icing vehicle component systems, the predetermined time window may be larger, and if the data relevance determination module 120 determines that the receiving vehicle is equipped with de-icing/anti-icing vehicle component systems, the predetermined time window may be smaller. That means, even if it may take longer for the receiving vehicle to arrive at the ice accretion location (i.e., later estimated time of arrival), the received environmental data 15 may still be relevant if the receiving vehicle is not equipped with de-icing/anti-icing capabilities. Accordingly, the predetermined time window may be set to be relatively larger. On the other hand, even if it may take shorter for the receiving vehicle to arrive at the ice accretion location (i.e., earlier estimated time of arrival), the received environmental data 15 may still be irrelevant if the receiving vehicle is equipped with de-icing/anti-icing vehicle component systems. Accordingly, the predetermined time window may be set to be relatively smaller.

In other embodiments, instead of merely adjusting the predetermined time window, the vehicle capabilities may be used directly in determining the relevance of the environmental data 15. For example, the relevance of the environmental data 15 may be determined based on the vehicle capabilities such as, e.g., sensor capability, de-icing/anti-icing capability, etc. If the environmental condition sensing and/or remediation capabilities of the receiving vehicle are limited (e.g., in view of the severity of the environmental condition, such as, e.g., a rate of ice accretion) or non-existent, the received environmental data 15 may be considered more relevant. However, if the environmental condition sensing and/or remediation capabilities of the receiving vehicle are high (e.g., if the receiving vehicle can withstand the environmental condition from the onset with only a minimal or no disruption), the received environmental data 15 may be considered less relevant. In some embodiments, the type and amount of the encountered icing condition (e.g., rate of ice accretion, etc.), which may be indicative of the severity of the encountered icing condition, may also be considered in determining the relevance of the environmental data 15. For example, if the type and amount of the encountered icing condition indicate a high level of severity, the received environmental data 15 may be considered more relevant. Conversely, if the type and amount of the encountered icing condition indicate a low level of severity, the received environmental data 15 may be considered less relevant.

It should be noted that, the factors in determining the relevance of the environmental data 15 specifically discussed herein are exemplary only, and many other factors may be considered in determining the data relevance, including the factors listed above with regards to the contextual information, and the relevance may be determined using different methods/formulas/equations. In some embodiments, the relevance determination may take into account a plurality of factors, with each factor being associated with a specific weight, and a total/final relevance score may be determined by summing the weighted relevance values pertaining to the plurality of factors.

Continuing with FIG. 3, at step 360, the data relevance determination module 120 may determine whether the received environmental data 15 is relevant. If the data relevance determination module 120 determines that the received environmental data 15 is irrelevant (e.g., relevance score is lower than a threshold value), the method may proceed to step 370 where the received environmental data 15 is discarded. However, in some embodiments, the received environmental data 15 may be retained and/or transmitted to the data server(s) 20 and/or the remote system(s) 30. If the data relevance determination module 120 determines that the received environmental data 15 is relevant (e.g., relevance score is higher than or equal to a threshold value), the received environmental data 15 may be forwarded to the remedial action control system 150 for further processing.

Figure 4:
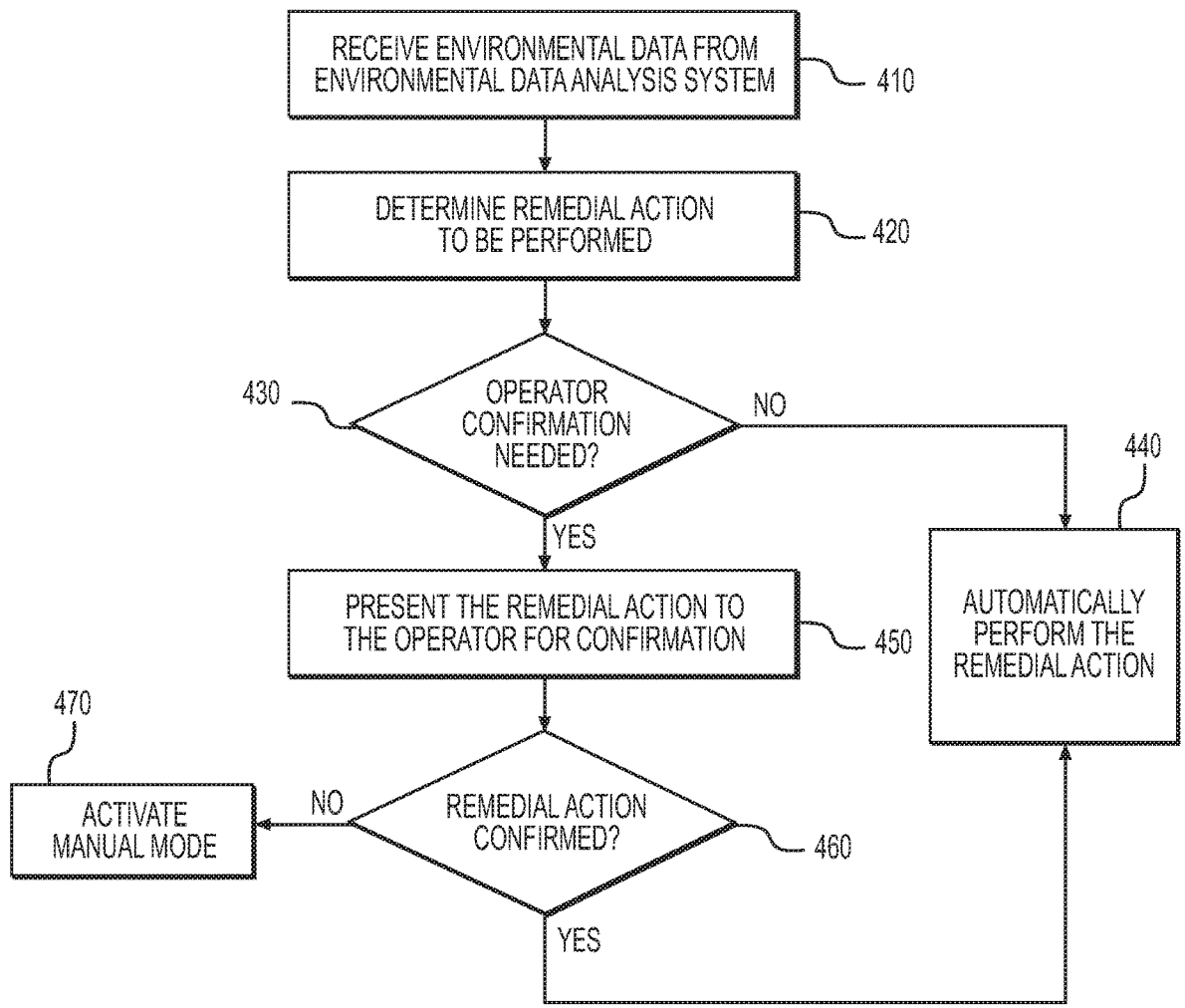
FIG. 4 is a flowchart illustrating an exemplary method of determining a remedial action based on environmental data, according to one aspect of the current disclosure.

FIG. 4 is a flowchart illustrating an exemplary method of determining a remedial action based on environmental data, according to one aspect of the current disclosure. In particular, the exemplary method illustrated in FIG. 4 may be performed by the remedial action control system 150 of the environmental condition response system 1000. At step 410, the remedial action control system 150 may receive the environmental data, which has been authenticated and verified for relevance by the environmental data analysis system 100. At step 420, the remedial action control system 150 may determine one or more remedial actions to be performed by the receiving vehicle. For example, based on the environmental data indicating the icing conditions experienced by the sending vehicle, the remedial action control system 150 may determine the vehicle component system(s) configured to perform de-icing/anti-icing measures at the receiving vehicle. The remedial action control system 150 may also determine the timing and/or the duration of the determined remedial action(s) (e.g., de-icing/anti-icing measures, etc.), whether there is enough time to perform the remedial action(s), etc. The remedial action control system 150 may also determine whether the receiving vehicle is equipped with the vehicle component system(s) configured to perform the remedial action(s) and/or whether there is enough time to perform the remedial action(s) at the determined timing and/or for the determined duration. If the remedial action control system 150 determines that the receiving vehicle is equipped with the vehicle component system(s) configured to perform the remedial action(s), and there is enough time to perform the remedial action(s) at the determined timing and/or for the determined duration, the remedial action control system 150 may set the remedial action(s) at the determined timing and/or for the determined duration as the remedial action(s) to be performed by the receiving vehicle. On the other hand, if the remedial action control system 150 determines that the receiving vehicle is not equipped with the vehicle component system(s) configured to perform the remedial action(s), or there is not enough time to perform the remedial action(s) at the determined timing and/or for the determined duration, the remedial action control system 150 may determine and set one or more alternate routes or flight level changes to avoid the reported environmental condition as the remedial action(s) to be performed by the receiving vehicle. The remedial action control system 150 may also determine the appropriate vehicle component system(s) configured to perform the route change and/or the flight level change.

Continuing with FIG. 4, at step 430, the remedial action control system 150 may determine whether a vehicle operator (or a crewmember) confirmation is needed to perform the remedial action(s). If the remedial action control system 150 determines that the confirmation is not needed, the method may proceed step 440, where the remedial action(s) are automatically performed by the appropriate vehicle component system(s) of the receiving vehicle. In order to activate the vehicle component system(s), the remedial action control system 150 may send instructions/commands to the vehicle component system(s), the instructions/commands including, for example, when and for how long the remedial action(s) need to be performed, alternate routes, flight level changes, etc. In response to receiving these instructions/commands, the vehicle component system(s) configured to perform the remedial action(s) may be activated and may perform the remedial action(s) in accordance with the instructions/commands.

If the remedial action control system 150 determines that the confirmation is needed, the method may proceed to step 450. At step 450, the remedial action control system 150 may present the determined remedial action(s) to the vehicle operator 130 (or the crewmember) for confirmation. At step 460, if the remedial action control system 150 determines that the vehicle operator 130 confirms the remedial action(s), the method may proceed to step 440, wherein the remedial action(s) are automatically performed by the appropriate vehicle component systems of the receiving vehicle as discussed above. On the other hand, if the remedial action control system 150 determines that the vehicle operator 130 does not confirm the remedial action(s), the method may proceed to step 470 where a manual mode may be activated. In manual mode, the remedial action control system 150 may present the relevant environmental data 15 to the vehicle operator 130 to merely aid in the decision-making process of the vehicle operator 130, and may not send instructions/commands to vehicle component system(s) to perform the remedial action(s) in an automated manner. For example, in manual mode, the remedial action control system 150 may present the relevant environmental data 15 via a display (such as, e.g., a cockpit system display of an aircraft, or a display of a portable computing device connected to the flight management system of an aircraft).

The remedial action control system 150 may also present the determined remedial action(s) and the recommended times/durations corresponding to the determined remedial action(s). Further, when the remedial action(s) are not performed in accordance with the recommended times/durations, the remedial action control system 150 may alert the vehicle operator 130. For example, if the remedial action control system 150 recommends turning on a de-icing/anti-icing vehicle component system at a certain time for a certain duration but the vehicle operator 130 fails to perform such an action, the remedial action control system 150 may alert the vehicle operator 130 (e.g., that the vehicle operator 130 did not turn on, or did not turn on for the recommended duration, etc.) and/or recommend one or more alternate routes or flight level changes if there is no longer enough time to perform the de-icing/anti-icing measures for the recommended duration. In some embodiments, the information and the alerts discussed above (e.g., relevant environmental data 15, remedial action(s) and recommended times/durations, alternate routes/flight level changes, etc.) may also be presented to crew member(s) of the receiving vehicle.

Embodiments of the present disclosure concerning environmental data sharing and context-based relevance determination addresses the drawbacks of the prior approaches, using some of the techniques discussed above. In general, the embodiments of the present disclosure have at least the following distinguishable features that lead to significant technical improvements:

1) real-time sharing of environmental data between moving vehicles to aid in timely remedial action(s) (e.g., real-time sharing of environmental data captured by a larger or more advanced vehicle equipped with advanced equipment and sensors, with smaller or less advanced vehicles with limited resources);

2) context-based solution to avoiding adverse environmental conditions, without requiring sensor and/or radar capabilities;

3) post-detection assistance via remedial action activation and/or recommendation; and 4) real-time adverse environmental condition avoidance based on current vehicle operating state and/or characteristics.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Figure 5:
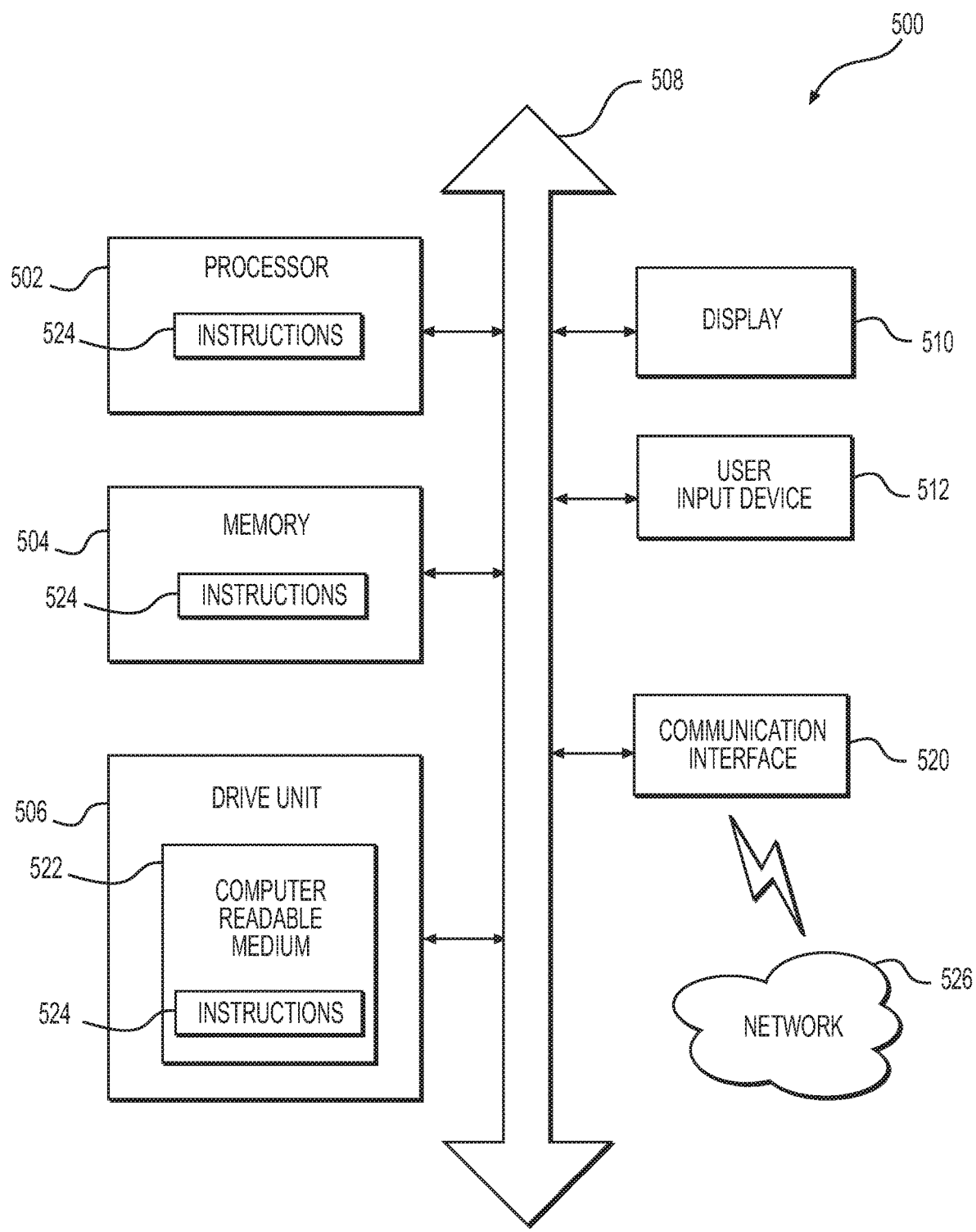
FIG. 5 illustrates an implementation of a computer system, according to one aspect of the current disclosure.

FIG. 5 illustrates an implementation of a general computer system designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 500 can be implemented using electronic devices that provide voice, video, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 500 may further include a display unit 510, such as a liquid crystal display (LCD), an organic light emitting diode (OLED), a flat panel display, a solid-state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive unit 506.

Additionally or alternatively, the computer system 500 may include an input device 512 configured to allow a user to interact with any of the components of system 500. The input device 512 may be a number pad, a keyboard, or a cursor control device, such as a mouse, or a joystick, touch screen display, remote control, or any other device operative to interact with the computer system 500.

The computer system 500 may also or alternatively include a disk or optical drive unit 506. The disk drive unit 506 may include a computer-readable medium 522 in which one or more sets of instructions 524, e.g. software, can be embedded. Further, the instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, a computer-readable medium 522 includes instructions 524 or receives and executes instructions 524 responsive to a propagated signal so that a device connected to a network 526 can communicate voice, video, audio, images, or any other data over the network 526. Further, the instructions 524 may be transmitted or received over the network 526 via a communication port or interface 520, and/or using a bus 508. The communication port or interface 520 may be a part of the processor 502 or may be a separate component. The communication port 520 may be created in software or may be a physical connection in hardware. The communication port 520 may be configured to connect with a network 526, external media, the display 510, or any other components in system 500, or combinations thereof. The connection with the network 526 may be a physical connection, such as a wired Ethernet connection or may be established wirelessly as discussed below. Likewise, the additional connections with other components of the system 500 may be physical connections or may be established wirelessly. The network 526 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 522 may be non-transitory, and may be tangible.

The computer-readable medium 522 can include a solid-state memory such as a memory card or other package that houses one or more non-volatile read-only memories. The computer-readable medium 522 can be a random-access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 500 may be connected to one or more networks 1026. The network 526 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 526 may include wide area networks (WAN), such as the Internet, local area networks (LAN), campus area networks, metropolitan area networks, a direct connection such as through a Universal Serial Bus (USB) port, or any other networks that may allow for data communication. The network 526 may be configured to couple one computing device to another computing device to enable communication of data between the devices. The network 526 may generally be enabled to employ any form of machine-readable media for communicating information from one device to another. The network 526 may include communication methods by which information may travel between computing devices. The network 526 may be divided into sub-networks. The sub-networks may allow access to all of the other components connected thereto or the sub-networks may restrict access between the components. The network 526 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for environmental data sharing and context-based relevance determination, comprising:
   receiving, by an environmental condition response system of a receiving vehicle, environmental data associated with a sending vehicle;
   analyzing, by the environmental condition response system of the receiving vehicle, the received environmental data for relevance based on contextual information of the receiving vehicle by determining whether an estimated time of arrival of the receiving vehicle to a location associated with the received environmental data is within a time window, wherein the time window is adjustable based on one or more of a remediation capability of the receiving vehicle and a severity of an environmental condition associated with the received environmental data;
   determining, by the environmental condition response system of the receiving vehicle, a remedial action based on determining that the environmental data received from the sending vehicle is relevant to the receiving vehicle; and
   in accordance with the determination that the environmental data received from the sending vehicle is relevant to the receiving vehicle, sending, by the environmental condition response system of the receiving vehicle, instructions to perform the remedial action to a corresponding vehicle component system of the receiving vehicle.

2. The computer-implemented method of claim 1, wherein the environmental data comprises one or more of: an environmental condition experienced by the sending vehicle, a time at which the environmental condition is experienced by the sending vehicle, a location at which the environmental condition is experienced by the sending vehicle, and a severity of the environmental condition experienced by the sending vehicle.

3. The computer-implemented method of claim 1, wherein the contextual information of the receiving vehicle comprises one or more of: a planned flight path, an altitude, a temperature, a humidity, a location, a speed, a size, a vehicle type, and a vehicle specification.

4. The computer-implemented method of claim 1, wherein the analyzing, by the environmental condition response system of the receiving vehicle, the received environmental data for relevance based on contextual information of the receiving vehicle comprises one or more of:
- determining whether a location of ice accretion is within a defined envelope of a planned flight path of the receiving vehicle;
- determining whether a time of ice accretion at the sending vehicle and a current time is within a specified time window;
- determining whether an estimated time of arrival at a location of ice accretion is within a predetermined time window; and
- determining an icing condition sensing capability or de-icing and/or anti-icing capability of the receiving vehicle.

5. The computer-implemented method of claim 1, wherein the environmental data comprises one or more of: an icing condition experienced by the sending vehicle, a time at which the icing condition is experienced by the sending vehicle, a location at which the icing condition is experienced by the sending vehicle, and a severity of the icing condition experienced by the sending vehicle.

6. The computer-implemented method of claim 5, wherein the severity of the icing condition experienced by the sending vehicle is indicated by one or more of the following: (i) a rate of ice accretion and (ii) a duration of de-icing or anti-icing system operation.

7. The computer-implemented method of claim 1, wherein the determining, by the environmental condition response system of the receiving vehicle, a remedial action comprises one or more of:
- determining a vehicle component system configured to perform the remedial action;
- determining a timing and a duration of the remedial action; and
- in response to determining that the remedial action cannot be performed for the determined duration, determining an alternate flight path or a flight level change.

8. The computer-implemented method of claim 1, wherein the sending, by the environmental condition response system of the receiving vehicle, instructions to perform the remedial action to a corresponding vehicle component system of the receiving vehicle is in response to determining that a vehicle operator confirms the remedial action.

9. The computer-implemented method of claim 8, further comprising:
- in response to determining that the vehicle operator does not confirm the remedial action, activating, by the environmental condition response system, a manual mode.

10. The computer-implemented method of claim 9, wherein the manual mode comprises one or more of:
- presenting the environmental data and the remedial action to the vehicle operator via a display; and
- alerting the vehicle operator in response to determining that the vehicle operator fails to perform the remedial action.

11. An environmental condition response system for environmental data sharing and context-based relevance determination, comprising:
- one or more processors; and
- a non-transitory computer readable medium storing instructions which, when executed by the one or more processors, cause the one or more processors to perform a method comprising:
  - receiving environmental data associated with a sending vehicle;
  - analyzing the received environmental data for relevance based on contextual information of the receiving vehicle by determining whether an estimated time of arrival of the receiving vehicle to a location associated with the received environmental data is within a time window, wherein the time window is adjustable based on one or more of a remediation capability of the receiving vehicle and a severity of an environmental condition associated with the received environmental data;
  - determining a remedial action based on determining that the environmental data received from the sending vehicle is relevant to the receiving vehicle; and
  - in accordance with the determination that the environmental data received from the sending vehicle is relevant to the receiving vehicle, sending instructions to perform the remedial action to a corresponding vehicle component system of the receiving vehicle.

12. The system of claim 11, wherein the analyzing the received environmental data for relevance based on contextual information of the receiving vehicle comprises one or more of:
- determining whether a location of ice accretion is within a defined envelope of a planned flight path of the receiving vehicle;
- determining whether a time of ice accretion at the sending vehicle and a current time is within a specified time window;
- determining whether an estimated time of arrival at a location of ice accretion is within a predetermined time window; and
- determining an icing condition sensing capability or de-icing and/or anti-icing capability of the receiving vehicle.

13. The system of claim 11, wherein the determining a remedial action comprises one or more of:
- determining a vehicle component system configured to perform the remedial action;
- determining a timing and a duration of the remedial action; and
- in response to determining that the remedial action cannot be performed for the determined duration, determining an alternate flight path or a flight level change.

14. The system of claim 11, wherein the remedial action comprises one or more of:
- activating a de-icing and/or anti-icing vehicle component system for a determined duration;
- traveling in an alternate route; and
- performing a flight level change.

15. The system of claim 11, wherein the environmental data comprises one or more of: an environmental condition experienced by the sending vehicle, a time at which the environmental condition is experienced by the sending vehicle, a location at which the environmental condition is experienced by the sending vehicle, and a severity of the environmental condition experienced by the sending vehicle.

16. A non-transitory computer readable medium storing instructions that, when executed by one or more processors, cause the one or more processors to perform a method for environmental data sharing and context-based relevance determination comprising:

receiving, by an environmental condition response system of a receiving vehicle, environmental data associated with a sending vehicle;

analyzing, by the environmental condition response system of the receiving vehicle, the received environmental data for relevance based on contextual information of the receiving vehicle by determining whether an estimated time of arrival of the receiving vehicle to a location associated with the received environmental data is within a time window, wherein the time window is adjustable based on one or more of a remediation capability of the receiving vehicle and a severity of an environmental condition associated with the received environmental data;

determining, by the environmental condition response system of the receiving vehicle, a remedial action based on determining that the environmental data received from the sending vehicle is relevant to the receiving vehicle; and in accordance with the determination that the environmental data received from the sending vehicle is relevant to the receiving vehicle, sending, by the environmental condition response system of the receiving vehicle, instructions to perform the remedial action to a corresponding vehicle component system of the receiving vehicle.

17. The non-transitory computer readable medium of claim 16, wherein the analyzing the received environmental data for relevance based on contextual information of the receiving vehicle comprises one or more of:

determining whether a location of ice accretion is within a defined envelope of a planned flight path of the receiving vehicle;

determining whether a time of ice accretion at the sending vehicle and a current time is within a specified time window;

determining whether an estimated time of arrival at a location of ice accretion is within a predetermined time window; and determining an icing condition sensing capability or de-icing and/or anti-icing capability of the receiving vehicle.

18. The non-transitory computer readable medium of claim 16, wherein the determining a remedial action comprises one or more of:

determining a vehicle component system configured to perform the remedial action;

determining a timing and a duration of the remedial action; and in response to determining that the remedial action cannot be performed for the determined duration, determining an alternate flight path or a flight level change.

19. The non-transitory computer readable medium of claim 16, wherein the remedial action comprises one or more of:

activating a de-icing and/or anti-icing vehicle component system for a determined duration;

traveling in an alternate route; and performing a flight level change.

20. The non-transitory computer readable medium of claim 16, wherein the environmental data comprises one or more of: an environmental condition experienced by the sending vehicle, a time at which the environmental condition is experienced by the sending vehicle, a location at which the environmental condition is experienced by the sending vehicle, and a severity of the environmental condition experienced by the sending vehicle.

* * * * *